(12) United States Patent
Mikami

(10) Patent No.: US 8,279,403 B2
(45) Date of Patent: Oct. 2, 2012

(54) EXPOSURE APPARATUS AND IMAGE FORMING APPARATUS

(75) Inventor: Ryo Mikami, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/555,930

(22) Filed: Sep. 9, 2009

(65) Prior Publication Data

US 2010/0073659 A1  Mar. 25, 2010

(30) Foreign Application Priority Data

Sep. 25, 2008 (JP) ................................ 2008-246594
Aug. 25, 2009 (JP) ................................ 2009-194643

(51) Int. Cl.
*G03B 27/54* (2006.01)
*G03B 27/72* (2006.01)

(52) U.S. Cl. ............................................ 355/67; 365/69
(58) Field of Classification Search .................... 355/67, 355/69, 70, 18; 257/205
See application file for complete search history.

(56) References Cited

FOREIGN PATENT DOCUMENTS

| JP | 8-072293 | 3/1996 |
|---|---|---|
| JP | 2001-313614 | 11/2001 |
| JP | 2002-094174 | 3/2002 |

*Primary Examiner* — Peter B Kim
(74) *Attorney, Agent, or Firm* — Fitzpatrick, Cella, Harper & Scinto

(57) ABSTRACT

An exposure apparatus has a first board on which a light-emitting element is mounted and a second board on which is mounted a driving IC for causing the light-emitting element to emit light. A second current path is extended from the driving IC, which is mounted on the second board, to the first board. The second current path is arranged so as to be adjacent to a first current path.

11 Claims, 6 Drawing Sheets

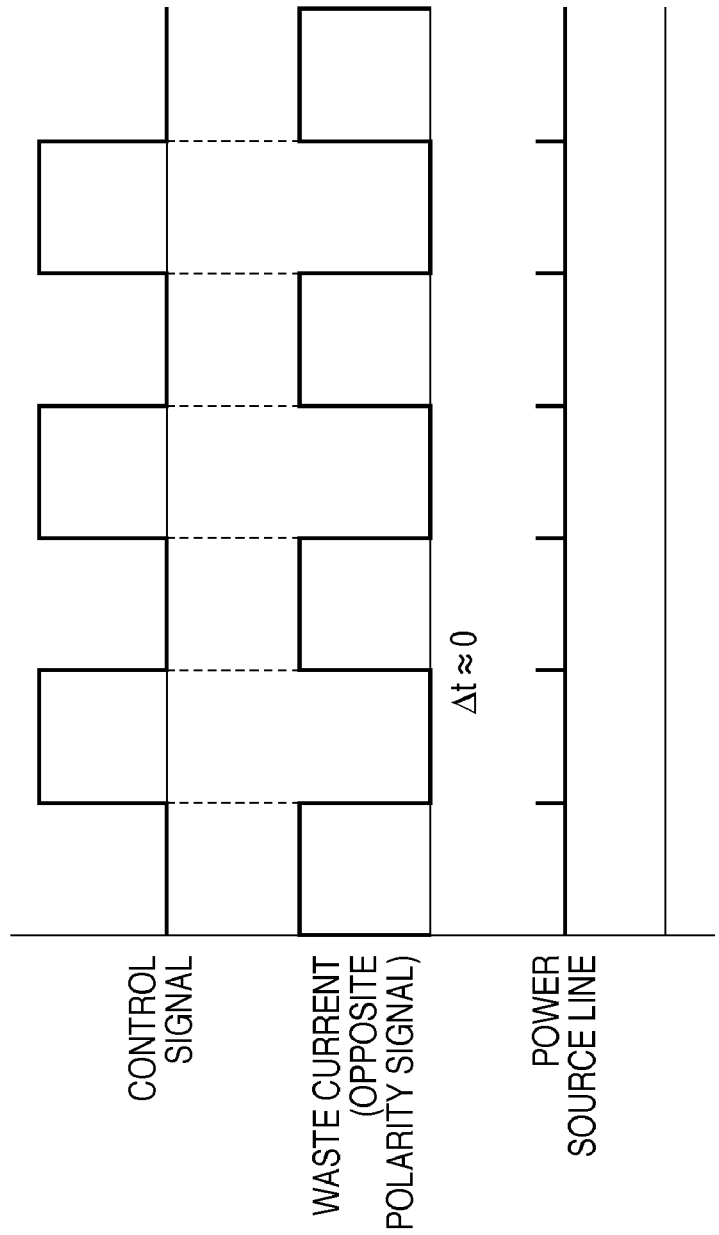

EXPOSURE APPARATUS AND IMAGE FORMING APPARATUS

BACKGROUND OF THE INVENTION

1. Field of the Invention

The present invention relates to an exposure apparatus and an image forming apparatus.

2. Description of the Related Art

An electrophotographic image forming apparatus forms an electrostatic latent image by exposing a photosensitive member to light emitted from a light source and develops the electrostatic latent image by toner to thereby form an image. One known method of exposing a photosensitive member involves causing light from a light source to scan the photosensitive member by a polygonal mirror and forming an electrostatic image on the rotating photosensitive member by the scanning light. A further known method involves arraying a plurality of light sources such as LEDs (light-emitting diodes) along the axis of rotation of a photosensitive member and causing these light sources to emit light to thereby form an electrostatic image on the photosensitive member.

In order to improve resolution and raise the speed of image formation, a driving circuit for driving a light-emitting element at a high driving frequency is required. In general, an emitter follower is employed in the driving circuit of the light source of the exposure apparatus. In accordance with the specification of Japanese Patent Laid-Open No. 8-72293, an arrangement in which two transistors are switched alternatingly is illustrated. A control signal for controlling an exposure light source is input to one of the transistors. Connected to the other transistor is a resistor the resistance of which is approximately equal to that of the light source, and a signal the polarity of which is opposite that of the control signal flows into this other transistor. The object of such a system is to utilize only the transistor turn-on characteristic. The driving circuit is arranged in such a manner that a current from a current source is conducted to the resistor in a case where the light source is not made to emit light. Furthermore, according to Japanese Patent Laid-Open No. 8-72293, an independent connection circuit is provided between a pulse modulating circuit and the exposure light-source driving circuit in order to prevent slowing of the control signal.

The exposure apparatus used in an ordinary printer is equipped with a laser and a polygonal mirror. In order to attain a higher speed, however, an available method dispenses with the polygonal mirror and uses a number of light-emitting elements [LEDs or VCSELs (Vertical Cavity Surface Emitting Lasers)]. With this method, it is possible to scan and expose a plurality of lines simultaneously by driving a number of light-emitting elements simultaneously.

In order to drive a number of light-emitting elements in this manner, however, it is necessary to take into consideration the arrangement of the light-emitting elements and the driving circuit elements that drive the light-emitting elements. An apparatus according to the prior art is shown in FIGS. 6A and 6B. As illustrated in FIG. 6A, light-emitting elements 202a, 202b, 202c, 202d and driving circuit elements 201a, 201b are mounted on a board 200. FIG. 6B is a diagram that focuses on the light-emitting element 202a and driving circuit element 201a extracted from FIG. 6A. As illustrated in FIG. 6B, a resistor R, a first current path 303 and a second current path 304 are mounted on the board 200. The driving circuit element 201a has transistors Tr1, Tr2 and an inverter 302. The transistors Tr1, Tr2 form a common-collector circuit, and the collectors of the two transistors are connected to a power source. A signal from an input terminal 301 is input to the base of the transistor Tr1, and a signal obtained by inverting the signal from the input terminal 301 is input to the base of the transistor Tr2. A signal based upon input image data is input to the input terminal 301.

In a case where the light-emitting element 202a is lit (e.g., in a case where an H-level signal is input from the input terminal 301), current from the current source flows into the first current path 303. On the other hand, in a case where the light-emitting element 202a is not lit (e.g., in a case where an L-level signal is input from the input terminal 301), current from the current source flows into the second current path 304.

Thus, since the conventional apparatus has a small number of light-emitting elements (exposure light sources), the light-emitting elements 202a, 202b, 202c, 202d and the driving circuit elements 201a, 201b can be mounted on the same board 200. As a result, as shown in FIG. 6B, the second current path 304 that conducts current from the current source to the resistor R in a case where the light-emitting element 202a is not lit can be placed in the neighborhood of and adjacent to the first current path 303 that conducts the current from the current source to the light-emitting element 202a in this case. In a case where the light-emitting element is turned ON and OFF (lit and extinguished) at a high frequency in such an arrangement, the frequencies of the voltages impressed upon the first and second current paths are of opposite polarity. As a consequence, radiant noise produced by the first current path takes on a polarity opposite the radiant noise of the second current path so that the radiant noise is cancelled out.

In a case where the number of light-emitting elements is increased in order to raise the speed of image formation, the board on which the light-emitting elements and the driving circuit elements are mounted must be enlarged. However, the space available for installing a board in a scanning apparatus is limited and there are instances where the light-emitting elements and driving circuit elements cannot be mounted on the same board.

In such cases the light-emitting elements (202a to 202n) and driving circuit elements (201a to 201n) are mounted on different boards, as illustrated in FIG. 7. However, when the light-emitting element 202a and driving circuit element 201a are mounted on separate boards, the first current path 303 and second current path 304 in FIG. 6B become more widely spaced apart and it is difficult for the radiant noise produced by both current paths to be cancelled out. In particular, different light-emitting elements (202b to 202n) and their driving circuit elements (201b to 201n) exist in the vicinity of the light-emitting element 202a and driving circuit element 201a, respectively, and there is the danger that such radiant noise will be picked up. When radiant noise is picked up, the light-emission state of the light-emitting elements becomes destabilized and stable exposure of the photosensitive member can no longer be carried out.

SUMMARY OF THE INVENTION

The present invention solves the problem that arises in the current paths from the driving circuit elements to the light sources in a case where the number of light-emitting elements is increased in order to raise image forming speed.

Further features of the present invention will become apparent from the following description of exemplary embodiments with reference to the attached drawings.

BRIEF DESCRIPTION OF THE DRAWINGS

FIG. 4 is a diagram illustrating an example of signals at the time of high-speed operation in an exposure apparatus having the example of connection shown in FIG. 2;

DESCRIPTION OF THE EMBODIMENTS

Embodiments of the present invention will be illustrated below. The individual embodiments described below will be useful in order to understand various concepts of the present invention, such as broader, intermediate and narrower concepts thereof. Further, the technical scope of the present invention is determined by the scope of the claims and is not limited by the individual embodiments set forth below.

Figure 1:
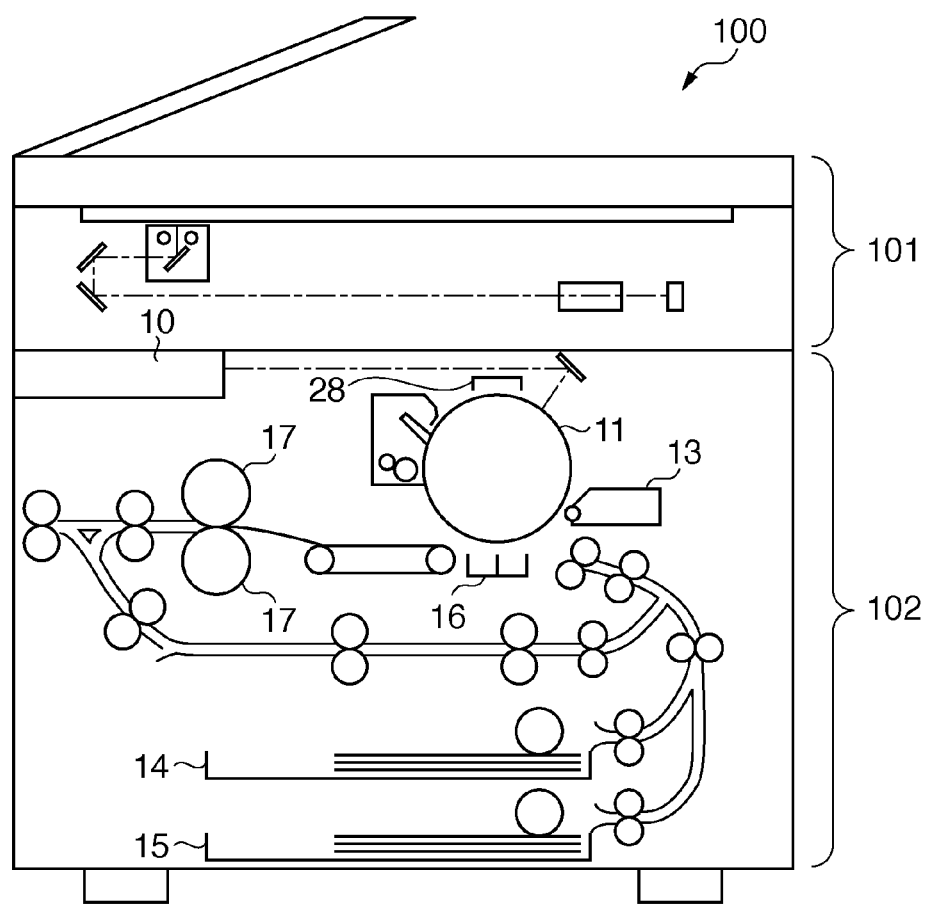
FIG. 1 is a schematic sectional view illustrating the overall configuration of an image forming apparatus according to the present invention.

FIG. 1 is a schematic sectional view illustrating the overall configuration of an image forming apparatus 100 according to the present invention. Although a copier is employed here as an example of the image forming apparatus, the image forming apparatus 100 may just as well be a printer, a multifunction peripheral or a facsimile machine.

The image forming apparatus 100 has an image reader 101 and an image forming unit 102. The image reader 101 reads the image of an original, generates image data (an image signal) and outputs the signal to an exposure controller 10 of the image forming unit 102. The exposure controller 10 may also be referred to as an exposure apparatus, scanning optical apparatus, optical scanning apparatus and optical scanner, by way of example.

A photosensitive member 11 is an example of an image carrier and has the shape of a drum (cylinder). A primary charging device 28 charges the surface of the photosensitive member 11 uniformly. The exposure controller 10 includes a light source (e.g., a laser) for outputting a light beam pulse-width modulated in accordance with the input image data, and deflecting components (e.g., a polygonal mirror or galvano-mirror) for deflecting the light beam in such a manner that the light beam will scan the image carrier in the main-scan direction. The light beam serves as illuminating light and a latent image is formed on the image carrier (photosensitive member 11). A developing unit 13 forms a toner image by developing the latent image that has been formed on the image carrier. In conjunction with the formation of the toner image, a print medium (paper, film, etc.) is conveyed to a transfer unit 16 by a first transfer member stacking unit 14 or second transfer member stacking unit 15. The transfer unit 16 transfers the toner image to the printing medium. A fixing unit 17 fixes the transferred toner image to the printing medium.

Figure 2:
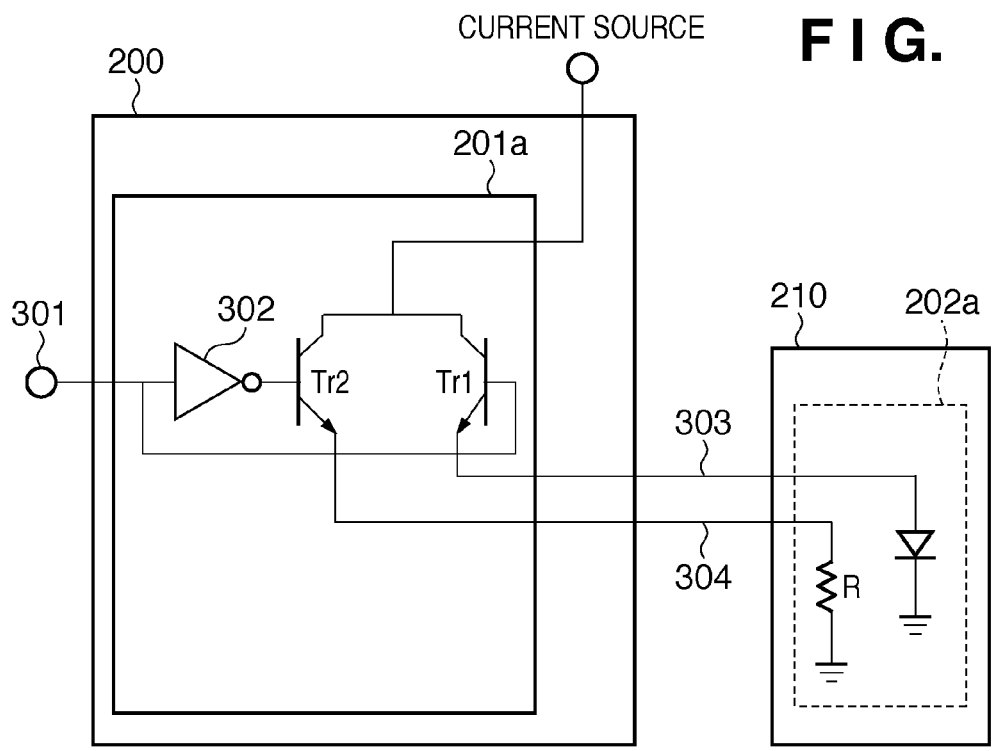
FIG. 2 is a diagram illustrating an example of connections between a light-emitting element and a driving IC in a case where the driving IC and light-emitting element are mounted on different boards and the two boards are connected by first and second current paths.
Figure 7:
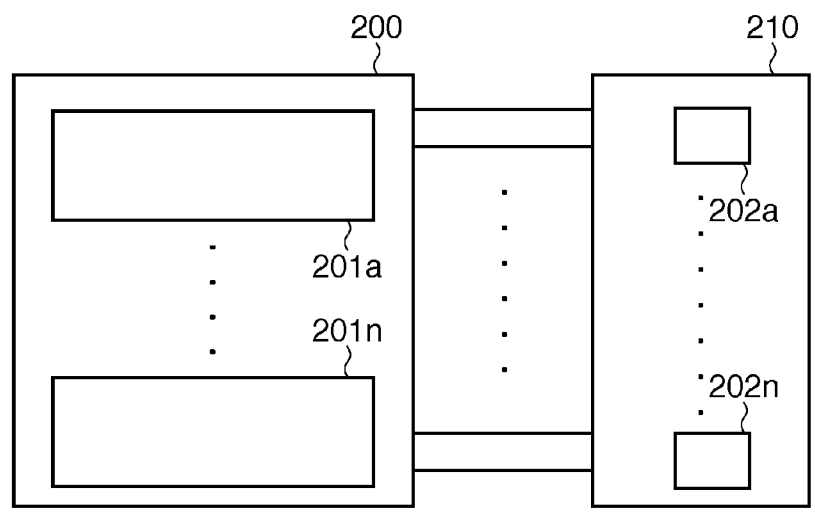
FIG. 7 is a diagram illustrating an example of connections between driving ICs and an light-emitting elements.

FIG. 2 is a diagram that focuses on the light-emitting element 202a and the driving circuit element 201a extracted from a diagram of the kind shown in FIG. 7 in which the light-emitting elements 202a to 202n are mounted on a first board 210 and the driving circuit elements (referred to also as "driving IC" below) 201a to 201n that drive the respective light-emitting elements 202a to 202n are mounted on a second board 200. In accordance with FIG. 2, the light-emitting elements 202a to 202n are arranged on the first board 210, and the driving ICs 201a to 201n are arranged on the second board 200. The first board 210 and second board 200 are connected by first current path 303 and second current path 304.

The driving circuit element 201a has transistors Tr1, Tr2 and inverter 302. The transistors Tr1, Tr2 form a common-collector circuit, and the collectors of the two transistors are connected to a power source. A signal from input terminal 301 is input to the base of the transistor Tr1, and a signal obtained by inverting the signal from the input terminal 301 is input to the base of the transistor Tr2. A signal based upon input image data is input to the input terminal 301.

In a case where the light-emitting element 202a is lit (e.g., in a case where an H-level signal is input from the input terminal 301), current from the current source flows into the first current path 303. On the other hand, in a case where the light-emitting element 202a is not lit (e.g., in a case where an L-level signal is input from the input terminal 301), current from the current source flows into the second current path 304. The first board 200 and second board 210 are connected by an FFC (flexible flat cable), FPC (flexible printed circuit), harness, or the like.

Figure 3:
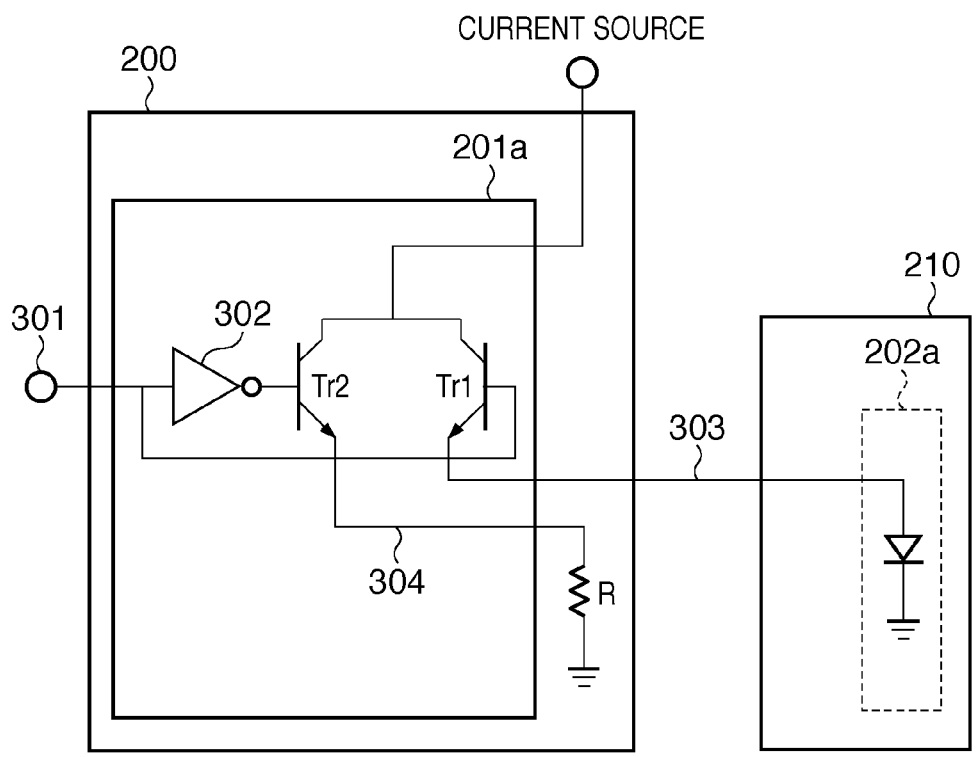
FIG. 3 is a diagram illustrating placement of first and second current paths in a case where a driving IC and light-emitting element are mounted on separate boards.

Although the problem of mounting space is solved by the spaced-apart placement of the driving IC and light-emitting element, a new problem arises. For example, as illustrated in FIG. 3, assume that the light-emitting element 202a and driving circuit element 201a are mounted on separate boards (200, 210). In this case, the first current path 303 that supplies current to the light-emitting element 202a is connected from the board 200 on which the driving circuit element 201a is mounted to the board 210 on which the light-emitting element 202a is mounted. The second current path 304, however, remains on the board 200 on which the driving circuit element 201a is mounted.

As mentioned earlier, radiant noise will not be cancelled out, the power-source line will become unstable and this will be accompanied by a decline in image quality unless care is taken in the method of wiring the first current path, which is for transmitting the current that lights the light-emitting element based upon the control signal, and the second current path, which is for transmitting the current that passes a current into the resistor R in a case where the light-emitting element is not lit based upon the control signal.

Figure 6A:
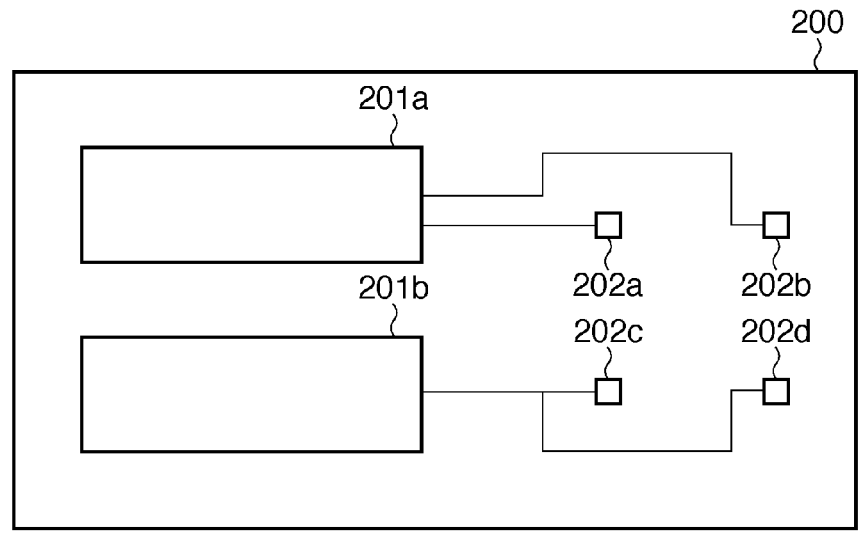
FIG. 6A is a diagram illustrating an example of signals at the time of high-speed operation.
Figure 6B:
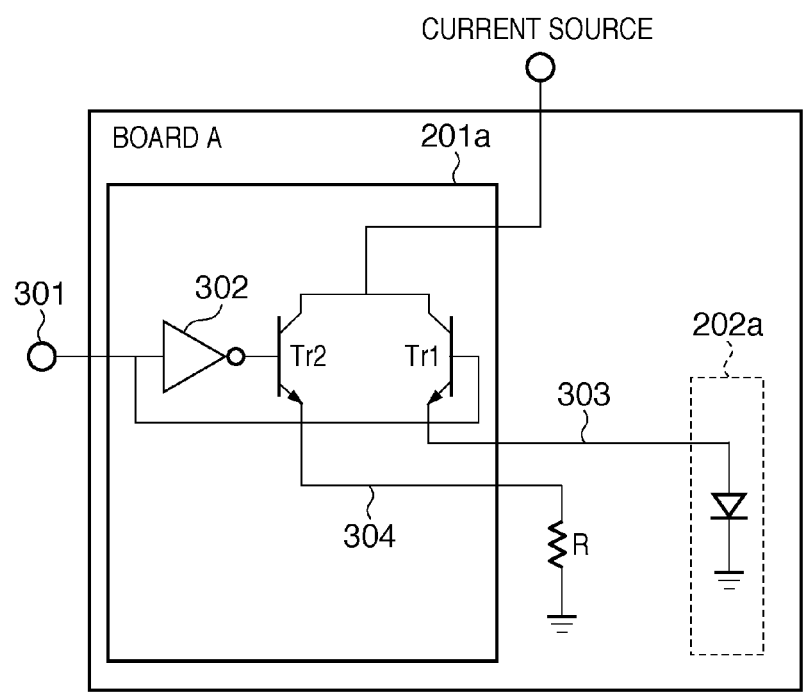
FIG. 6B is a diagram illustrating an example of connections between a light-emitting element and a driving IC in a case where the driving IC and light-emitting element are mounted on the same board.

The following problem can also arise: If the driving IC 201a and light-emitting element 202b can be mounted on the same board, the first current path 303 and second current path 304 can be mounted on the board 200 so as neighbor each other as shown in FIGS. 6A, 6B. Further, if the driving IC 201a and light-emitting element 202b can be mounted on the same board, the difference between the length of the first current path 303 and the length of the second current path 304 can be reduced.

However, if the driving IC 201a (and resistor R) and the corresponding light-emitting element 202a are mounted on separate boards, as illustrated in FIG. 3, the length of the first current path 303 and the length of the second current path 304 will differ. That is, a difference in impedance develops between the first current path 303 and second current path 304.

Figure 8:
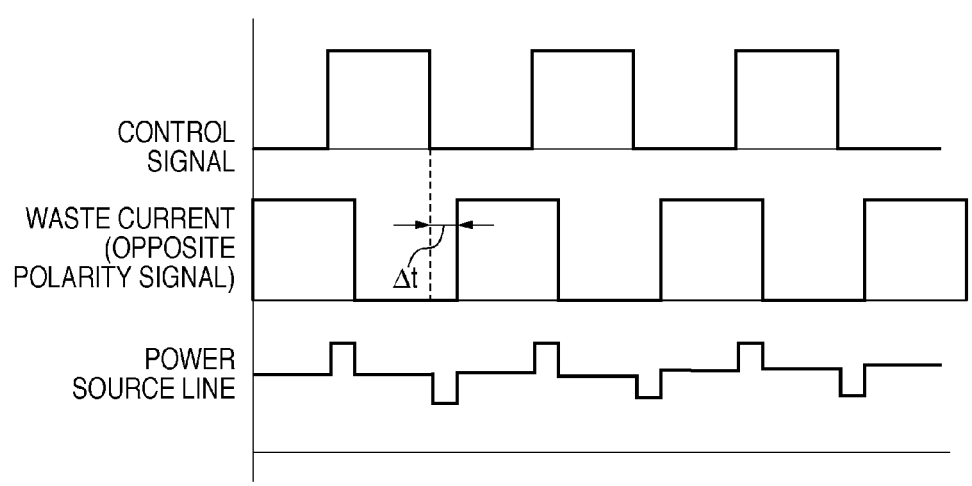
FIG. 8 is a diagram illustrating an example of signals at the time of high-speed operation in an exposure apparatus having the example of connection shown in FIG. 7.

FIG. 8 is a diagram illustrating an example of signals at the time of high-speed operation in the case of the example of connection shown in FIG. 3. If the driving IC 201a (and resistor R) and the corresponding light-emitting element 202a are mounted on different boards, the difference in impedance between first current path 303 and second current path 304 is no longer negligible particularly at the time of high-speed operation. This means that the transmission time of the signal on the first current path 303 is different from the transmission time of the signal on the second current path 304.

In accordance with FIG. 8, it will be understood that the control signal lags behind the signal of opposite polarity by Δt. Since such delay destabilizes the power source line, the control signals of other light-emitting elements are also adversely affected. Furthermore, since the current loop also is enlarged, radiant noise can also increase.

Accordingly, in this embodiment, the second current path 304 is extended from the driving IC 201a, which is mounted on the second board 200, to the first board 210, as illustrated in FIG. 2. The second current path 304 is routed so as to neighbor the first current path 303. It should be noted that if the first current path 303 and second current path 304 are made of equal lengths, the impedance difference between the two current paths diminishes and this has the effect of suppressing the influence of radiant noise. This method of solution is capable of solving the above-described problem not only in a case where the driving IC and light-emitting element are placed on different boards but also in a case where they are placed on the same board.

If the arrangement in which the first and second current paths are placed side by side can be implemented, the resistor R may be mounted external to the light-emitting element 202a or may be mounted within the light-emitting element.

FIG. 4 is a diagram illustrating an example of signals at the time of high-speed operation in the case of the arrangement shown in FIG. 2. Since the two current paths are adjacent to each other, it is difficult for radiant noise to occur. Further, since the two current paths are of equal length, it is difficult for a time difference to develop between the time it takes for the current that flows into first current path 303 to reach the ground side and the time it takes for the current that flows into second current path 304 to reach the ground side. The plurality of driving ICs drive the corresponding light-emitting elements at mutually complementary timings. As a consequence, the phase difference between the signals that flow through both current paths ideally is 180°. Applying the present invention diminishes a shift from the phase difference of 180°. Current loop also diminishes, thus the present invention contributes to reduce radiant noise.

Figure 5A:
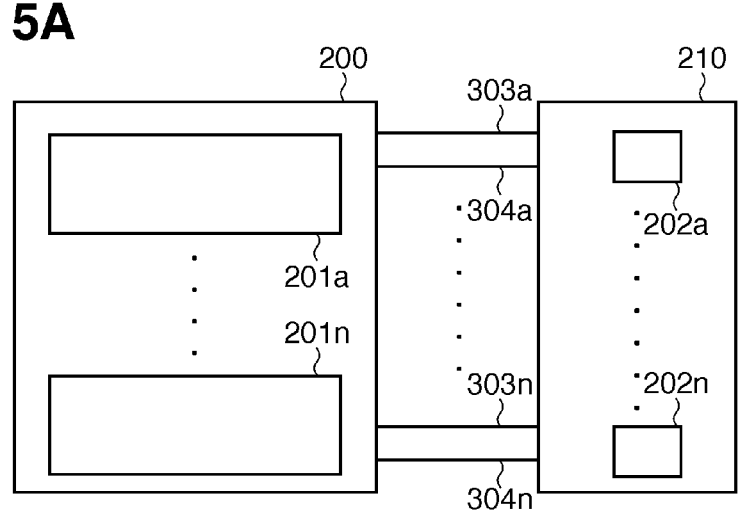
FIG. 5A is a diagram illustrating an example in which an equal-length, parallel-run arrangement is implemented by a flexible flat cable.

FIG. 5A is a diagram illustrating an example in which an equal-length, parallel-run arrangement is implemented by a flexible flat cable. Parallel-run portions of two current paths 303a, 304a from the driving IC 201a to the light-emitting element 202a and two current paths 303n, 304n from the driving IC 201n to the light-emitting element 202n are implemented by a flexible flat cable. That is, a flexible flat cable can be used since it is structurally easy to achieve the equal-length, parallel-run arrangement.

Figure 5B:
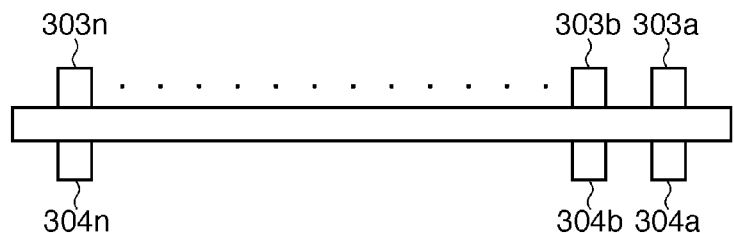
FIG. 5B is a diagram illustrating an example in which equal-length, parallel-run arrangement is implemented by a flexible printed circuit.

FIG. 5B is a diagram illustrating an example in which the equal-length, parallel-run arrangement is implemented by a flexible printed circuit. In general, a flexible printed circuit consists of a plurality of layers. In accordance with FIG. 5B, first and second current paths forming a pair are arranged in different layers among a plurality of layers.

Although a two-layer flexible printed circuit is employed here in the parallel-run portion of two current paths, a multi-layer flexible printed circuit of three or four layers, or the like, may be employed. In accordance with FIG. 5B, the current paths 303a, 304a forming a pair are wired in parallel one above the other. Similarly, current paths 303b, 304b forming a pair and current paths 303n, 304n forming a pair are wired in parallel one above the other. By thus wiring a pair of current paths in parallel one above the other, it is easy to achieve the equal-length, parallel-run arrangement.

Figure 5C:
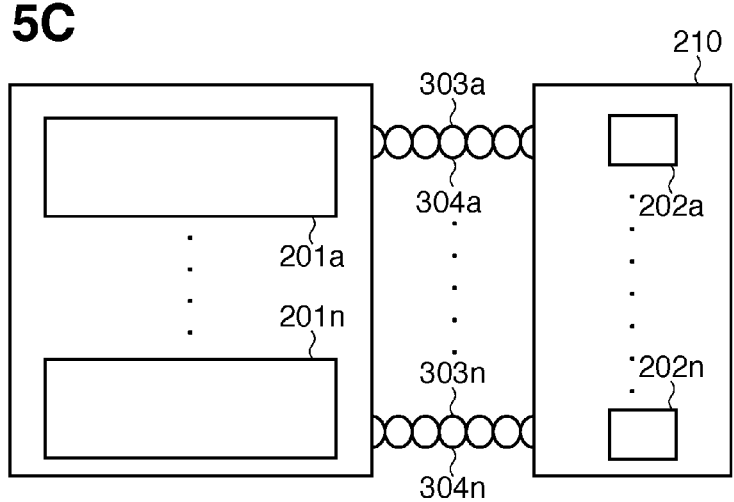
FIG. 5C is a diagram illustrating an example in which equal-length, parallel-run arrangement is implemented by a harness member.

FIG. 5C is a diagram illustrating an example in which the equal-length, parallel-run arrangement is implemented by a harness member. In accordance with FIG. 5C, the first board 200 and second board 210 are connected by a harness. That is, the parallel-run portion of two current paths is constituted by a harness member.

The harness member is a cable formed by bundling a plurality of conductors. In particular, by adopting twisted wires for the pair of current paths 303a, 304a, the equal-length, parallel-run arrangement is achieved. In accordance with FIGS. 5A and 5B, side-by-side placement of the pair of current paths also is achieved.

In accordance with this embodiment, as described above, a first current path for transmitting a control signal and a second current path for transmitting a signal of opposite polarity up to a prescribed resistor are made of equal lengths and are arranged to run in parallel, thereby reducing the impedance difference between these current paths. Similarly, loop area is reduced as well. As a result, low noise and little skew are achieved even at the time of high-speed drive, and stabilization of the power source line can be expected.

If the equal-length, parallel-run arrangement of first and second current paths can be implemented, then the above-described effects can be expected both in a case where the light-emitting portion and driving circuit have been mounted on the same board and in a case where these have been mounted on different boards.

A wire material that readily achieves the equal-length, parallel-run arrangement, such as FFC, FPC or harness, may be employed at the parallel-run portion of the first and second current paths. In particular, with regard to FPC, the equal-length, parallel-run arrangement is readily achieved by placing the first and second current paths in the adjacent upper and lower layers, respectively. Further, in the case of a harness, the equal-length, parallel-run arrangement is readily achieved by using twisted wires as the first and second current paths.

In this embodiment, an example in which the resistor R is placed on the board 210 is described. However, the resistor R may just as well be placed on the board 200. By placing the resistor R on the board 200, heat emitted from the resistor R and heat emitted from the light-emitting element can be dispersed even in a case where the light-emitting element is turned on and off repeatedly during image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-246594, filed Sep. 25, 2008 and 2009-

194643, filed Aug. 25, 2009, which are hereby incorporated by reference herein in their entirety.

What is claimed is:

1. An exposure apparatus attached to an image forming apparatus for forming a latent image on a photosensitive member by a light-emitting element that emits light based upon an input image signal and developing the latent image to thereby form an image, said exposure apparatus comprising:
 a first board on which a light-emitting element is mounted;
 a power source configured to supply the light-emitting element with current; and
 a driving circuit configured to selectively conduct current from said power source either to a first current path connected to the light-emitting element or to a second current path connected to a resistor different from the light-emitting element, wherein said driving circuit is a circuit which, based upon the input image signal, conducts current from said power source to the first current path in a case where the light-emitting element is made to emit light, and conducts current from said power source to the second current path in a case where the light-emitting element is not made to emit light; and
 a second board, different from said first board, on which said driving circuit is mounted,
 wherein the second current path conducts the current from the driving circuit to said first board, on which the light-emitting element is mounted, and is arranged so as to lie adjacent to the first current path.

2. The apparatus according to claim 1, wherein said driving circuit includes:
 a first transistor having a base to which the input image signal is input;
 a second transistor forming a common-collector circuit together with said first transistor; and
 an inverter, which has an output side connected to a base terminal of said second transistor, for inverting and outputting the input image signal,
 wherein the first current path is coupled to an emitter terminal of the first transistor and the second current path is coupled to an emitter terminal of the second transistor.

3. The apparatus according to claim 2, wherein a plurality of light-emitting portions and the resistor are mounted on said first board; and
 said first transistor and said second transistor are mounted on said second board.

4. The apparatus according to claim 2, wherein at least portions of the first and second current paths are constituted by a flexible flat cable.

5. The apparatus according to claim 1, wherein the resistor is mounted on said second board.

6. The apparatus according to claim 1, wherein at least portions of the first and second current paths are constituted by a flexible printed circuit.

7. The apparatus according to claim 6, wherein said flexible printed circuit is constituted by a plurality of layers; and
 the first and second current paths are arranged in different layers among the plurality of layers.

8. The apparatus according to claim 1, wherein at least portions of the first and second current paths are constituted by a harness member.

9. The apparatus according to claim 8, wherein the first and second current paths are constituted by twisted wires.

10. An image forming apparatus having the exposure apparatus set forth in claim 1.

11. The apparatus according to claim 1, wherein the impedance of the second current path is equal to the impedance of the first current path.

* * * * *